(12) United States Patent
Liu et al.

(10) Patent No.: US 7,761,902 B2
(45) Date of Patent: Jul. 20, 2010

(54) SYSTEM AND METHOD OF PROVIDING VIDEO CONTENT

(75) Inventors: Kuo-Hui Liu, San Ramon, CA (US); Yongdong Zhao, Pleasanton, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 494 days.

(21) Appl. No.: 11/803,009

(22) Filed: May 11, 2007

(65) Prior Publication Data
US 2008/0282301 A1    Nov. 13, 2008

(51) Int. Cl.
H04N 7/173    (2006.01)
H04N 7/16    (2006.01)

(52) U.S. Cl. .......................... 725/95; 725/151
(58) Field of Classification Search ................. 725/151, 725/95
See application file for complete search history.

(56) References Cited

U.S. PATENT DOCUMENTS

| 6,049,823 | A  | * | 4/2000  | Hwang ........................ 725/82 |
| 6,166,730 | A  | * | 12/2000 | Goode et al. ................ 715/716 |
| 7,430,222 | B2 | * | 9/2008  | Green et al. ................. 370/486 |
| 7,444,419 | B2 | * | 10/2008 | Green ........................ 709/231 |
| 7,477,653 | B2 | * | 1/2009  | Smith et al. ................. 370/432 |
| 2002/0124258 | A1 | * | 9/2002  | Fritsch ......................... 725/88 |
| 2003/0093814 | A1 | * | 5/2003  | Birmingham ................ 725/136 |
| 2004/0034863 | A1 | * | 2/2004  | Barrett et al. .................. 725/38 |
| 2004/0034864 | A1 | * | 2/2004  | Barrett et al. .................. 725/38 |
| 2004/0261094 | A1 | * | 12/2004 | Huslak et al. .................. 725/25 |
| 2005/0071882 | A1 | * | 3/2005  | Rodriguez et al. ............. 725/95 |
| 2005/0081244 | A1 | * | 4/2005  | Barrett et al. .................. 725/97 |
| 2005/0183120 | A1 | * | 8/2005  | Jain et al. ...................... 725/46 |
| 2005/0216948 | A1 | * | 9/2005  | MacInnis ..................... 725/117 |
| 2006/0126667 | A1 | * | 6/2006  | Smith et al. ................... 370/486 |
| 2007/0016688 | A1 | * | 1/2007  | Hester et al. ................. 709/238 |
| 2007/0174883 | A1 | * | 7/2007  | McEnroe et al. ............... 725/95 |
| 2007/0192812 | A1 | * | 8/2007  | Pickens et al. ................. 725/95 |
| 2007/0204312 | A1 | * | 8/2007  | Wheelock ..................... 725/95 |

* cited by examiner

Primary Examiner—Brian T Pendleton
Assistant Examiner—Fernando Alcon
(74) Attorney, Agent, or Firm—Toler Law Group

(57) ABSTRACT

A method of providing video content includes receiving a channel change data packet from a set-top box device at a subscriber premise via a packet-based video distribution network. The channel change data packet includes data indicating a requested channel and a channel change index value. The method also includes reading the channel change data packet to identify the channel change index value. The channel change index value indicates an available bandwidth at the subscriber premise to receive video content of the requested channel via the packet-based video distribution network. The method also includes allocating an overhead bandwidth to the set-top box device based on the channel change index value.

30 Claims, 6 Drawing Sheets

SYSTEM AND METHOD OF PROVIDING VIDEO CONTENT

FIELD OF THE DISCLOSURE

The present disclosure is generally related to providing video content.

BACKGROUND

Television provides information and entertainment to many viewers. Content providers offer a large number of channels that allow viewers to select from a wide variety of programming. Viewers often change channels during commercials or when a program is scheduled to begin. Some video distribution networks can exhibit latency in displaying video content of a selected channel. This latency can be frustrating to viewers, especially when they desire to quickly review the content displayed on multiple channels. Accordingly, there is a need for an improved system and method of providing video content.

DETAILED DESCRIPTION OF THE DRAWINGS

Figure 1:
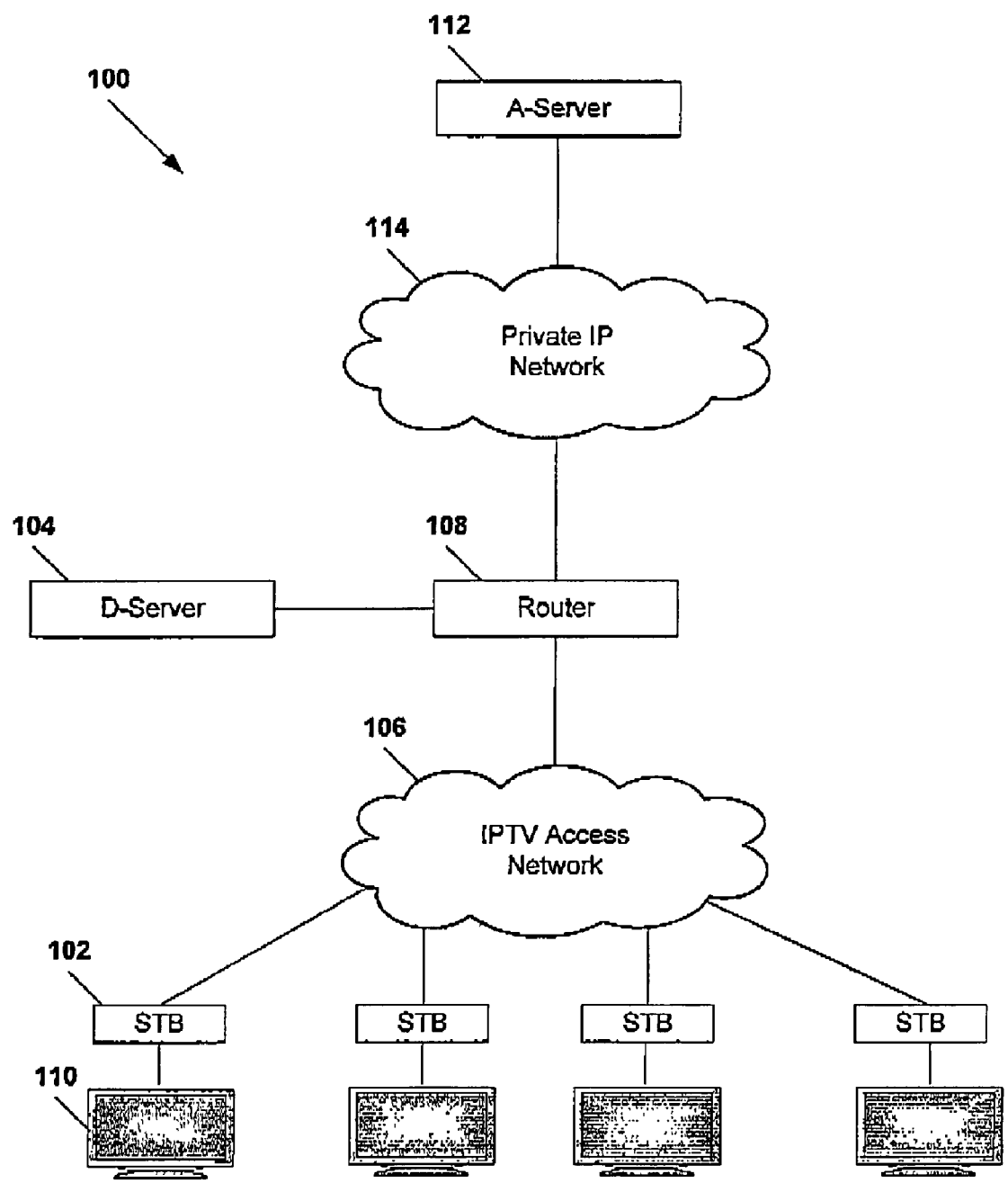
FIG. 1 is a block diagram of a particular embodiment of a system to provide video content.

A system to provide video content is disclosed and includes a server system including processing logic and memory accessible to the processing logic. The memory includes instructions executable by the processor to receive a channel change data packet from a set-top box device at a subscriber premise via a packet-based video distribution network. The channel change data packet includes data indicating a requested channel and a channel change index value. The memory also includes instructions executable by the processor to identify the channel change index value, where the channel change index value indicates a number of devices at the subscriber premise receiving video content via the packet-based video distribution network. The memory includes instructions executable by the processor to allocate an overhead bandwidth to the set-top box device based on the channel change index value.

In another embodiment, a set-top box device is disclosed and includes a network interface communicating with a packet-based video distribution network. The set-top box device also includes a processor and a memory device accessible to the processor. The memory device includes instructions executable by the processor to receive a channel change request and to send a channel change data packet to a server via a packet-based video distribution network. The channel change data packet including data indicating a requested channel and a channel change index value. The channel change index value indicates a number of devices at a subscriber premise receiving video content via the packet-based video distribution network.

In another embodiment, a method of providing video content is disclosed and includes receiving a channel change data packet from a set-top box device at a subscriber premise via a packet-based video distribution network. The channel change data packet includes data indicating a requested channel and a channel change index value. The method also includes reading the channel change data packet to identify the channel change index value. The channel change index value indicates an available bandwidth at the subscriber premise to receive video content of the requested channel via the packet-based video distribution network. The method also includes allocating an overhead bandwidth to the set-top box device based on the channel change index value.

In another embodiment, a method of providing video content is disclosed and includes receiving a channel change request at a set-top box device at a subscriber premise and sending a channel change data packet from the set-top box device to a server via a packet-based video distribution network. The channel change data packet includes data indicating a requested channel and a channel change index value. The channel change index value indicates an available bandwidth at the subscriber premise to receive video content of the requested channel via the packet-based video distribution network.

In another embodiment, a computer-readable medium is disclosed and includes processor-readable instructions adapted to cause a processor to execute a method comprising receiving a channel change data packet from a set-top box device at a subscriber premise via a packet-based video distribution network, where the channel change data packet includes data indicating a requested channel and a channel change index value. The method also includes reading the channel change data packet to identify the channel change index value, where the channel change index value indicates an available bandwidth at the subscriber premise to receive video content of the requested channel via the packet-based video distribution network. Further, the method includes allocating an overhead bandwidth to the set-top box device based on the channel change index value and sending video data packets including video content associated with the requested channel to the set-top box device at an increased rate equal to a subscribed bandwidth associated with the set-top box device, plus the allocated overhead bandwidth.

Referring to FIG. 1, a block diagram of a particular embodiment of a system to provide video content is illustrated and designated generally 100. The system 100 includes a plurality of set-top box devices 102 coupled to a plurality of display devices 110. In a particular embodiment, one or more of the set-top box devices 102 can be located at a single premise and can communicate with each other. Each set-top box device 102 communicates with a D-server 104 via an Internet Protocol Television (IPTV) access network 106. In an illustrative embodiment, the D-server 104 can be a dedicated channel change server and can communicate with the IPTV access network 106 via a network router 108, such as a router of a regional or metropolitan video distribution hub. In addition, each set-top box device 102 communicates with one or more video sources, such as the A-server 112. For example, the A-server 112 can communicate with the IPTV access network 106 via a private IP network 114. The A-server 112 can be located at a video head-end office, such as a national or super video head-end.

In a particular illustrative embodiment, one of the set-top box devices 102 receives a channel change request from a viewer. In response to the channel change request, the set-top box device 102 sends a channel change data packet to the D-server 104 via the IPTV access network 106. The channel change data packet can indicate a requested channel and a channel change index value. In a particular embodiment, the set-top box device 102 determines the channel change index value to include in the channel change data packet. The channel change index value indicates an available bandwidth at the subscriber premise to receive video content of the requested channel and can be based, for example, on a total number of display devices (including the requesting set-top box device 102) currently receiving video content from the IPTV access network 106 via set-top box devices at the viewer's premise.

Upon receiving the channel change data packet from the set-top box device 102, the D-server 104 determines the channel change index value by reading the channel change data packet. The D-server 104 compares the channel change index value to a table of channel change index values stored at the D-server 104 to allocate an overhead bandwidth corresponding to the set-top box device 102 from which the channel change data packet was received. The overhead bandwidth can be a bandwidth used by the D-server 104, in addition to the subscribed bandwidth allotted to the set-top box device 102, to send video content to the set-top box device 102 in response to a channel change until a buffer at the set-top box device 102 is filled with video content of a requested channel. The overhead bandwidth can be within a range such that a total rate used to send video content to the set-top box device is faster than the set-top box device 102 can decode video content but not more than a total bandwidth allocated to the viewer's premise (e.g., 25 Mbps). For example, the overhead bandwidth can be ten percent to one hundred percent of the subscribed bandwidth.

In an illustrative embodiment, the overhead bandwidth can be equal to the subscribed bandwidth associated with the set-top box device 102 divided by the channel change index value. For example, where the subscribed bandwidth associated with the set-top box device 102 is equal to 2 Mbps, and the channel change index value is 1, the D-server 104 can determine an overhead bandwidth of 2 Mbps corresponding to the set-top box device 102. Hence, the D-server 104 can send video content of a requested channel to the set-top box device 102 at a rate of twice the subscribed bandwidth, or 4 Mbps, until a buffer at the set-top box device 102 is filled with video content of the requested channel.

In another example, two display devices 110 at the viewer's home can be receiving video content via the IPTV access network 106, making the channel change index value equal to two. Where the subscribed bandwidth associated with the set-top box device 102 is equal to 2 Mbps, the D-server 104 can determine an overhead bandwidth of 1 Mbps (i.e., 2 Mbps/2) corresponding to the set-top box device 102. Hence, the D-server 104 can send video content of a requested channel to the set-top box device 102 at a rate of 3 Mbps until a buffer at the set-top box device 102 is filled with video content of the requested channel.

In a particular embodiment, the D-Server 104 can buffer video content of a plurality of channels that it receives from the A-Server 112. The D-server 104 unicasts IP data packets that include video content of the requested channel to the set-top box device 102 at an increased rate equal to the subscribed bandwidth associated with the set-top box device 102, plus the overhead bandwidth allocated by the D-Server 104, until an amount of video content buffered at the D-Server 104 for the requested channel is sent to the set-top box device 102. After the D-server 104 sends all the buffered data to the set-top box device 102, the D-server 104 reduces the rate at which it transmits video content of the requested channel to the set-top box device 102 to the overhead bandwidth. Additionally, the D-server 104 can send an instruction to the set-top box device 102 to send a join request to a multicast video server, such as the A-server 112, to join a multicast group associated with the requested channel.

The set-top box device 102 can send a join request, such as an IGMP join request, to the A-server 112. After the set-top box device 102 begins receiving data packets from the A-server 112 that include video content associated with the requested channel, the set-top box device 102 can send a stop indication to the D-server 104, and the D-server 104 can stop unicasting video content to the set-top box device 102 in response to the stop indication. In an illustrative, non-limiting embodiment, the set-top box device 102 can determine whether there is a gap between the unicast video content received from the D-server 104 and the multicast video content received from the A-server 112. If the set-top box device 102 determines that there is such a gap, the set-top box device 102 can send a retry request to the D-server 104. In response to the retry request, the D-server 104 can resend one or more data packets that include video content of the requested channel to fill the gap. The resent data packets can be transmitted at the subscribed rate associated with the set-top box device or at an increased rate, such as a pre-defined packet retry rate, or a rate equal to the subscribed rate, plus the overhead channel change rate.

Figure 2:
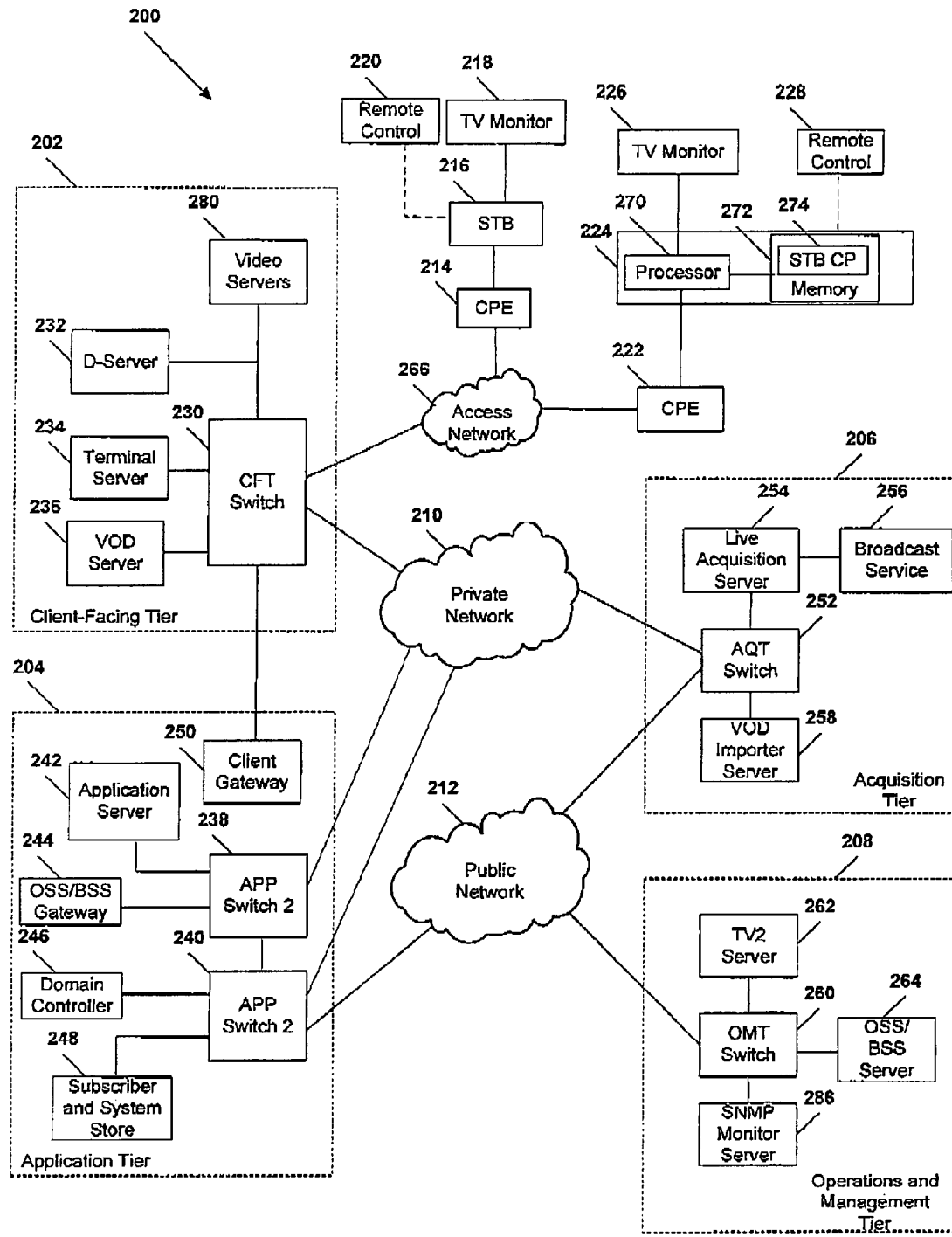
FIG. 2 is a block diagram of a second particular embodiment of a system to provide video content.

Referring to FIG. 2, a diagram of an Internet Protocol Television (IPTV) system that can be used to provide video content in response to channel change requests is illustrated and designated generally 200. As shown, the system 200 can include a client facing tier 202, an application tier 204, an acquisition tier 206, and an operations and management tier 208. Each tier 202, 204, 206, 208 is coupled to a private network 210; to a public network 212, such as the Internet; or to both the private network 210 and the public network 212. For example, the client-facing tier 202 can be coupled to the private network 210. Further, the application tier 204 can be coupled to the private network 210 and to the public network 212. The acquisition tier 206 can also be coupled to the private network 210 and to the public network 212. Additionally, the operations and management tier 208 can be coupled to the public network 212.

As illustrated in FIG. 2, the various tiers 202, 204, 206, 208 communicate with each other via the private network 210 and the public network 212. For instance, the client-facing tier 202 can communicate with the application tier 204 and the acquisition tier 206 via the private network 210. The application tier 204 can communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204, including, but not limited to, a client gateway 250, can communicate directly with the client-facing tier 202:

The client-facing tier 202 can communicate with user equipment via an access network 266, such as an Internet Protocol Television (IPTV) access network. In an illustrative embodiment, customer premises equipment (CPE) 214, 222 can be coupled to a local switch, router, or other device of the access network 266. The client-facing tier 202 can communicate with a first representative set-top box device 216 via the first CPE 214 and with a second representative set-top box device 224 via the second CPE 222. In a particular embodiment, the first representative set-top box device 216 and the first CPE 214 can be located at a first customer premise, and the second representative set-top box device 224 and the second CPE 222 can be located at a second customer premise. In another particular embodiment, the first representative set-top box device 216 and the second representative set-top box device 224 can be located at a single customer premise, both coupled to one of the CPE 214, 222. The CPE 214, 222 can include routers, local area network devices, modems, such as digital subscriber line (DSL) modems, any other suitable devices for facilitating communication between a set-top box device and the access network 266, or any combination thereof.

In an exemplary embodiment, the client-facing tier 202 can be coupled to the CPE 214, 222 via fiber optic cables. In another exemplary embodiment, the CPE 214, 222 can be digital subscriber line (DSL) modems that are coupled to one or more network nodes via twisted pairs, and the client-facing tier 202 can be coupled to the network nodes via fiber-optic cables. Each set-top box device 216, 224 can process data received via the access network 266, via an IPTV software platform, such as Microsoft® TV IPTV Edition.

The first set-top box device 216 can be coupled to a first external display device, such as a first television monitor 218, and the second set-top box device 224 can be coupled to a second external display device, such as a second television monitor 226. Moreover, the first set-top box device 216 can communicate with a first remote control 220, and the second set-top box device 224 can communicate with a second remote control 228. The set-top box devices 216, 224 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 216, 224 can receive data, video, or any combination thereof, from the client-facing tier 202 via the access network 266 and render or display the data, video, or any combination thereof, at the display device 218, 226 to which it is coupled. In an illustrative embodiment, the set-top box devices 216, 224 can include tuners that receive and decode television programming signals or packet streams for transmission to the display devices 218, 226. Further, the set-top box devices 216, 224 can include a STB processor 270 and a STB memory device 272 that is accessible to the STB processor 270. In one embodiment, a computer program, such as the STB computer program 274, can be embedded within the STB memory device 272.

In an illustrative embodiment, the client-facing tier 202 can include a client-facing tier (CFT) switch 230 that manages communication between the client-facing tier 202 and the access network 266 and between the client-facing tier 202 and the private network 210. As illustrated, the CFT switch 230 is coupled to one or more data servers, such as D-servers 232, that store, format, encode, replicate, or otherwise manipulate or prepare video content for communication from the client-facing tier 202 to the set-top box devices 216, 224. The CFT switch 230 can also be coupled to a terminal server 234 that provides terminal devices with a point of connection to the IPTV system 200 via the client-facing tier 202. In a particular embodiment, the CFT switch 230 can be coupled to a video-on-demand (VOD) server 236 that stores or provides VOD content imported by the IPTV system 200. Further, the CFT switch 230 is coupled to one or more video servers 280 that receive video content and transmit the content to the set-top boxes 216, 224 via the access network 266.

In an illustrative embodiment, the client-facing tier 202 can communicate with a large number of set-top boxes, such as the representative set-top boxes 216, 224, over a wide geographic area, such as a metropolitan area, a viewing area, a statewide area, a regional area, a nationwide area or any other suitable geographic area, market area, or subscriber or customer group that can be supported by networking the client-facing tier 202 to numerous set-top box devices. In a particular embodiment, the CFT switch 230, or any portion thereof, can include a multicast router or switch that communicates with multiple set-top box devices via a multicast-enabled network.

As illustrated in FIG. 2, the application tier 204 can communicate with both the private network 210 and the public network 212. The application tier 204 can include a first application tier (APP) switch 238 and a second APP switch 240. In a particular embodiment, the first APP switch 238 can be coupled to the second APP switch 240. The first APP switch 238 can be coupled to an application server 242 and to an OSS/BSS gateway 244. In a particular embodiment, the application server 242 can provide applications to the set-top box devices 216, 224 via the access network 266, which enable the set-top box devices 216, 224 to provide functions, such as interactive program guides, video gaming, display, messaging, processing of VOD material and other IPTV content, etc. In an illustrative embodiment, the application server 242 can provide location information to the set-top box devices 216, 224. In a particular embodiment, the OSS/BSS gateway 244 includes operation systems and support (OSS) data, as well as billing systems and support (BSS) data. In one embodiment, the OSS/BSS gateway 244 can provide or restrict access to an OSS/BSS server 264 that stores operations and billing systems data.

The second APP switch 240 can be coupled to a domain controller 246 that provides Internet access, for example, to users at their computers 268 via the public network 212. For example, the domain controller 246 can provide remote Internet access to IPTV account information, e-mail, personalized Internet services, or other online services via the public network 212. In addition, the second APP switch 240 can be coupled to a subscriber and system store 248 that includes account information, such as account information that is associated with users who access the IPTV system 200 via the private network 210 or the public network 212. In an illustrative embodiment, the subscriber and system store 248 can store subscriber or customer data and create subscriber or customer profiles that are associated with IP addresses, stock-keeping unit (SKU) numbers, other identifiers, or any combination thereof, of corresponding set-top box devices 216, 224. In another illustrative embodiment, the subscriber and system store can store data associated with capabilities of set-top box devices associated with particular customers.

In a particular embodiment, the application tier 204 can include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. In an illustrative embodiment, the set-top box devices 216, 224 can access the IPTV system 200 via the access network 266, using information received from the client gateway 250. User devices can access the client gateway 250 via the access network 266, and the client gateway 250 can allow such devices to access the private network 210 once the devices are authenticated or verified. Similarly, the client gateway 250 can prevent unauthorized devices, such as hacker computers or stolen set-top box devices from accessing the private network 210, by denying access to these devices beyond the access network 266.

For example, when the first representative set-top box device 216 accesses the client-facing tier 202 via the access network 266, the client gateway 250 can verify subscriber information by communicating with the subscriber and system store 248 via the private network 210. Further, the client gateway 250 can verify billing information and status by communicating with the OSS/BSS gateway 244 via the private network 210. In one embodiment, the OSS/BSS gateway 244 can transmit a query via the public network 212 to the OSS/BSS server 264. After the client gateway 250 confirms subscriber and/or billing information, the client gateway 250 can allow the set-top box device 216 to access IPTV content and VOD content at the client-facing tier 202. If the client gateway 250 cannot verify subscriber information for the set-top box device 216, e.g., because it is connected to an unauthorized twisted pair, the client gateway 250 can block transmissions to and from the set-top box device 216 beyond the access network 266.

As indicated in FIG. 2, the acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to an acquisition server 254 that receives or acquires television content, movie content, advertisement content, other video content, or any combination thereof, from a broadcast service 256, such as a satellite acquisition system or satellite head-end office. In a particular embodiment, the live acquisition server 254 can transmit content to the AQT switch 252, and the AQT switch 252 can transmit the content to the CFT switch 230 via the private network 210.

In an illustrative embodiment, content can be transmitted to the D-servers 232, where it can be encoded, formatted, stored, replicated, or otherwise manipulated and prepared for communication from the video server(s) 280 to the set-top box devices 216, 224. The CFT switch 230 can receive content from the video server(s) 280 and communicate the content to the CPE 214, 222 via the access network 266. The set-top box devices 216, 224 can receive the content via the CPE 214, 222, and can transmit the content to the television monitors 218, 226. In an illustrative embodiment, video or audio portions of the content can be streamed to the set-top box devices 216, 224.

Further, the AQT switch 252 can be coupled to a video-on-demand importer server 258 that receives and stores television or movie content received at the acquisition tier 206 and communicates the stored content to the VOD server 236 at the client-facing tier 202 via the private network 210. Additionally, at the acquisition tier 206, the video-on-demand (VOD) importer server 258 can receive content from one or more VOD sources outside the IPTV system 200, such as movie studios and programmers of non-live content. The VOD importer server 258 can transmit the VOD content to the AQT switch 252, and the AQT switch 252, in turn, can communicate the material to the CFT switch 230 via the private network 210. The VOD content can be stored at one or more servers, such as the VOD server 236.

When users issue requests for VOD content via the set-top box devices 216, 224, the requests can be transmitted over the access network 266 to the VOD server 236, via the CFT switch 230. Upon receiving such requests, the VOD server 236 can retrieve the requested VOD content and transmit the content to the set-top box devices 216,124 across the access network 266, via the CFT switch 230. The set-top box devices 216, 224 can transmit the VOD content to the television monitors 218, 226. In an illustrative embodiment, video or audio portions of VOD content can be streamed to the set-top box devices 216, 224.

FIG. 2 further illustrates that the operations and management tier 208 can include an operations and management tier (OMT) switch 260 that conducts communication between the operations and management tier 208 and the public network 212. In the embodiment illustrated by FIG. 2, the OMT switch 260 is coupled to a TV2 server 262. Additionally, the OMT switch 260 can be coupled to an OSS/BSS server 264 and to a simple network management protocol (SNMP) monitor 286 that monitors network devices within or coupled to the IPTV system 200. In a particular embodiment, the OMT switch 260 can communicate with the AQT switch 252 via the public network 212.

In an illustrative embodiment, the live acquisition server 254 can transmit content to the AQT switch 252, and the AQT switch 252, in turn, can transmit the content to the OMT switch 260 via the public network 212. In this embodiment, the OMT switch 260 can transmit the content to the TV2 server 262 for display to users accessing the user interface at the TV2 server 262. For example, a user can access the TV2 server 262 using a personal computer 268 coupled to the public network 212.

In a particular illustrative embodiment, one of the set-top box devices, such as the second representative set-top box device 224, receives a channel change request from a viewer, for example, via the remote control device 228. In response to the channel change request, the set-top box device 224 sends a channel change data packet to the D-server 232 via the access network 266. In a particular embodiment, the set-top box device 224 determines a channel change index value to include in the channel change data packet. The channel change data packet can indicate a requested channel and the channel change index value.

Upon receiving the channel change data packet from the set-top box device 224, the D-server 232 determines the channel change index value by reading the channel change data packet. The D-server 232 compares the channel change index value to a table of channel change index values stored at the D-server 232 to allocate an overhead bandwidth corresponding to the set-top box device 224. The overhead bandwidth can be a bandwidth used by the D-server 232, in addition to the subscribed bandwidth allotted to the set-top box device 224, to send video content to the set-top box device 224 in response to a channel change until a buffer at the set-top box device 224 is filled with video content of a requested channel. For example, the overhead bandwidth can be within a range such that a total rate used to send video content to the set-top box device is faster than the set-top box device 224 can decode video content but not more than a total bandwidth allocated to the viewer's premise (e.g., 25 Mbps). In a particular embodiment, the D-server 232 can obtain the subscribed bandwidth associated with the set-top box device 224, a total bandwidth associated with the viewer's premise, or a combination thereof, from the subscriber and system store 248 or other server of the IPTV system 200 that stores subscriber or set-top box device data.

In a particular embodiment, the D-Server 232 buffers video content of a plurality of channels that it receives from one or more live acquisition servers 254. The D-server 232 unicasts IP data packets that include video content of the requested channel to the set-top box device 224 at an increased rate equal to the subscribed bandwidth associated with the set-top box device 224, plus the overhead bandwidth allocated by the D-server 232, until an amount of video content buffered at the D-Server 232 for the requested channel is sent to the set-top box device 224. After the D-server 232 sends all the buffered data, the D-server 232 reduces the rate at which it transmits video content of the requested channel to the set-top box device 224 to the overhead bandwidth. Additionally, the D-server 232 can send an instruction to the set-top box device 224 to send a join request to a multicast video server, such as the video server 280 or the acquisition server 254, to join a multicast group associated with the requested channel.

The set-top box device 224 can send a join request, such as an IGMP join request, to the acquisition server 254 or other multicast video server. After the set-top box device 224 begins receiving data packets from the acquisition server 254 that include video content associated with the requested channel, the set-top box device 224 can send a stop indication to the D-server 232, and the D-server 232 can stop unicasting video content to the set-top box device 224 in response to the stop indication. In an illustrative, non-limiting embodiment, the set-top box device 224 can determine whether there is a gap between the unicast video content received from the D-server 232 and the multicast video content received from the acquisition server 254. If the set-top box device 224 determines that there is such a gap, the set-top box device 224 can send a retry request to the D-server 232. In response to the retry request, the D-server 232 can resend one or more data packets that include video content of the requested channel to fill the gap. The resent data packets can be transmitted at the subscribed rate associated with the set-top box device or at an increased rate, such as a pre-defined packet retry rate, or a rate equal to the subscribed rate, plus the overhead channel change rate.

Figure 3:
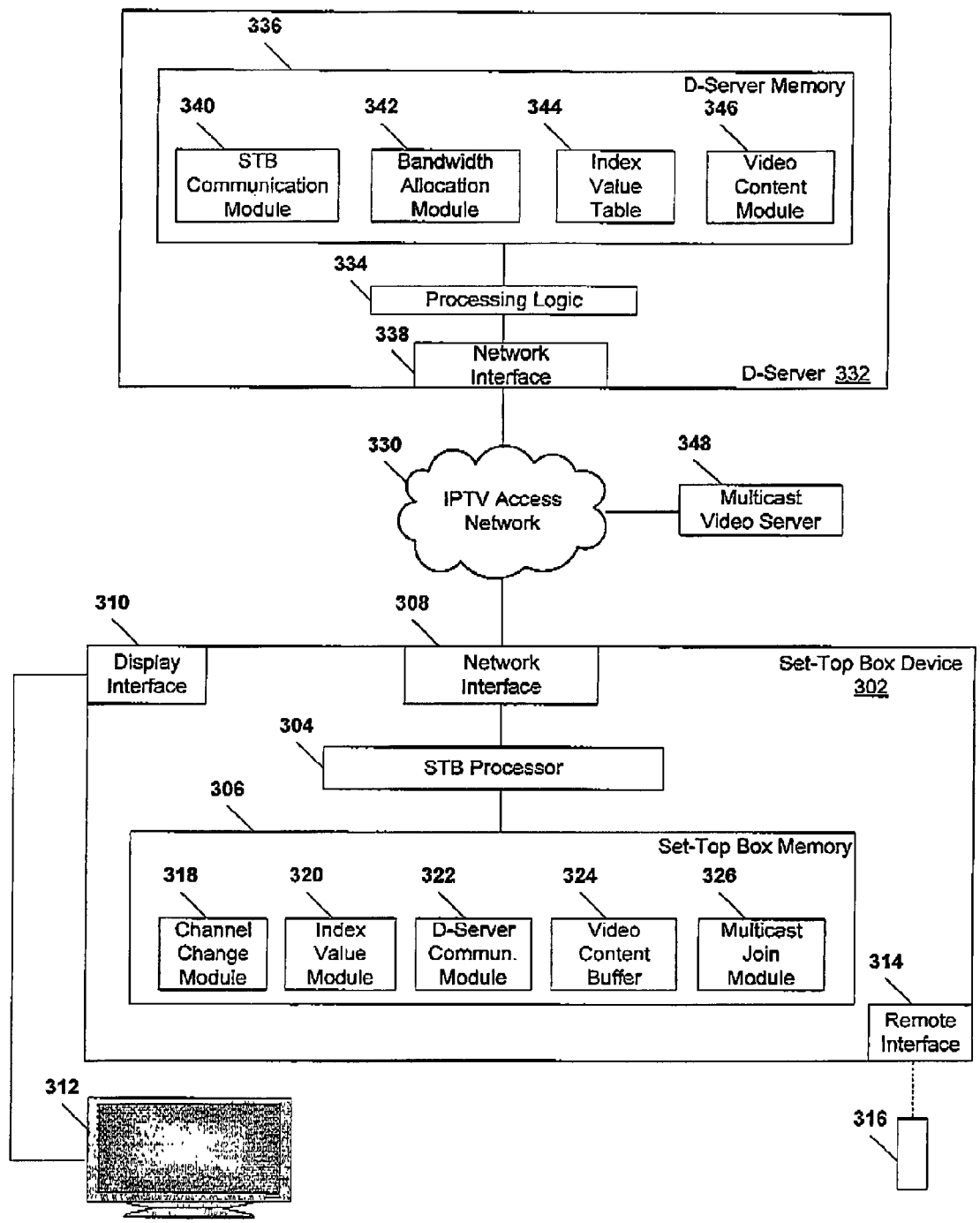
FIG. 3 is a block diagram of a third particular embodiment of a system to provide video content.

Referring to FIG. 3, a third particular embodiment of a system to provide video content is illustrated and generally designated 300. The system 300 includes a set-top box device 302 communicating with a D-server 332 via an IPTV access network 330. The set-top box device 302 also communicates with at least one multicast video server 348 via the IPTV access network 330. In an alternative embodiment, the multicast video server(s) 348 can communicate with the IPTV access network via a core network, such as the private IP networks illustrated in FIGS. 1-2.

The set-top box device 302 includes a processor 304 and a memory 304 accessible to the processor 304. In a particular embodiment, the processor 304 can communicate with the IPTV access network 330 via a network interface 308. In an illustrative embodiment, the network interface 308 can communicate with the IPTV access network 330 via a residential gateway or other customer premise equipment. Further, the processor 304 can communicate with a display interface 310 coupled to a display device 312. In addition, the processor 304 can communicate with a remote interface 314 that can receive signals from a remote control device 316.

In the embodiment illustrated in FIG. 3, the memory 306 can store instructions that are executable by the processor 304 to perform various functions of the set-top box device 302. Such instructions are represented as modules 318-326 and can be embodied in one or more operating systems, applications or other computer programs. In alternative embodiments, one or more of the functions provided by the modules 318-326 may be implemented using hardware logic.

Further, the memory 306 can include a channel change module 318 that is executable by the processor 304 to receive a channel change request from a viewer, for instance, via the remote control device 316. Further, the memory 306 can include an index value module 320 that is executable by the processor 304 to determine a channel change index value. For example, the set-top box device 302 can communicate or attempt to communicate with other set-top box devices at the viewer's premise to determine whether they are active and receiving video content via the IPTV access network 330. The index value module 320 is executable by the processor 304 to determine a channel change index value that indicates an available bandwidth at the subscriber premise to receive video content of the requested channel. In an illustrative embodiment, the channel change index value can be equal to the number of total set-top box devices at the viewer's premise are receiving such video content.

In a particular embodiment, the memory 306 can include a D-Server communication module 322 that is executable by the processor 304 to send a channel change data packet to the D-Server that includes data indicating a requested channel and the channel change index value. In addition, the memory 306 can include a video content buffer 324 that decodes and buffers video content received via the IPTV access network 330. The video content buffer 324 can receive IP data packets including video content of a requested channel from the D-Server 332 at a rate that is higher than a subscribed rate associated with the set-top box device 302, such as a rate that is equal to the subscribed rate plus a channel change overhead rate determined by the D-Server 332. After the set-top box device 302 receives an amount of video content buffered at the D-Server 332 for the requested channel, the video content buffer 324 can receive IP data packets including the video content of the requested channel from the D-Server 332 at the overhead rate.

In a particular embodiment, the D-Server communication module 322 can be executable by the processor 304 to receive an instruction from the D-Server 332 to join a multicast group associated with the requested channel. For example, the set-top box device 302 can receive such an instruction after the video content buffer 324 is full. The memory 306 can include a multicast join module 326 that is executable by the processor 304 to issue an Internet Group Multicast Protocol (IGMP) join request to the multicast server 348 associated with the requested channel. Further, when the video content buffer 324 receives one or more video data packets including video content of the requested channel, the D-Server communication module 322 can be executable by the processor 304 to send a stop indication to the D-Server 332.

In an illustrative, non-limiting embodiment, the D-Server communication module 322 can be executable by the processor 304 to send a retry request to the D-Server 332 if there are gaps in video content received from the D-Server 332 and that received from the multicast server 348. The video content buffer 324 can receive re-sent data packets from the D-Server 332 to fill the gap at the subscribed rate or an increased rate.

A shown in FIG. 3, the D-Server 332 can include processing logic 334 and memory 336 accessible to the processing logic. The D-Server 332 can be a server system that includes one or more server devices that are dedicated to providing video content in response to channel change requests within a metropolitan, regional or other geographical area. In an illustrative embodiment, the D-Server 332 can include a network interface 338 that facilitates communication between the processor 334 and the IPTV access network 336. In the embodiment illustrated in FIG. 3, the memory 336 can store instructions that are executable by the processor 334 to perform various functions of the D-Server 332. Such instructions are represented as modules 340-346 and can be embodied in one or more operating systems, applications or other computer programs. In alternative embodiments, one or more of the functions provided by the modules 340-346 may be implemented using hardware logic.

In a particular embodiment, the memory 336 can include a set-top box communication module 340 that is executable by the processor 334 to receive a channel change data packet from the set-top box device 302. Further, the memory 336 can include a bandwidth allocation module that is executable by the processor 334 to read the channel change index value from the channel change data packet and allocate a channel change overhead bandwidth to the set-top box device 302. In an illustrative embodiment, the memory 336 can store an index value table that relates channel change index values to overhead bandwidth allocation amounts or to factors or multiples for determining an allocated overhead bandwidth based on a subscribed bandwidth and a channel change index value.

In a particular embodiment, the memory 336 can include a video content module that is executable by the processor 334 to receive and buffer video content associated with a plurality of channels from one or more video sources. Further, the video content module 346 can be executable by the processor 334 to send a buffered amount of video data of the requested channel to the set-top box device 302 at a rate equal to the subscribed bandwidth associated with the set-top box device, plus the overhead bandwidth allocated by the D-Server 332.

After the D-server 332 sends the amount of buffered video data of the requested channel to the set-top box device 302, the bandwidth allocation module 342 can be executable by the processor 334 to reduce that bandwidth allocated to the set-top box device to the overhead rate, and the video content module 346 can be executable by the processor 334 to send video content associated with the requested channel to the set-top box device 302 at the overhead rate. In an illustrative embodiment, the set-top box communication module 340 can be executable by the processor 334 to send an instruction to the set-top box device 302 to join a multicast group associated with the requested channel. Further, the set-top box communication module 340 can be executable by the processor 334 to receive a stop indication from the set-top box device 302 indicating that the set-top box device 302 has begun receiving video content from the multicast server 348. In response to the stop indication, the video content module 346 can cease transmission of video content to the set-top box device 302.

In an illustrative, non-limiting embodiment, the set-top box communication module 340 can be executable by the processor 334 to receive a retry request from the set-top box device 302 indicating that there are gaps in video content received from the D-Server 332 and that received from the multicast server 348. The video content module 346 can re-send data packets to the set-top box device 302 to fill the gap at the subscribed rate or an increased rate.

Figure 4:
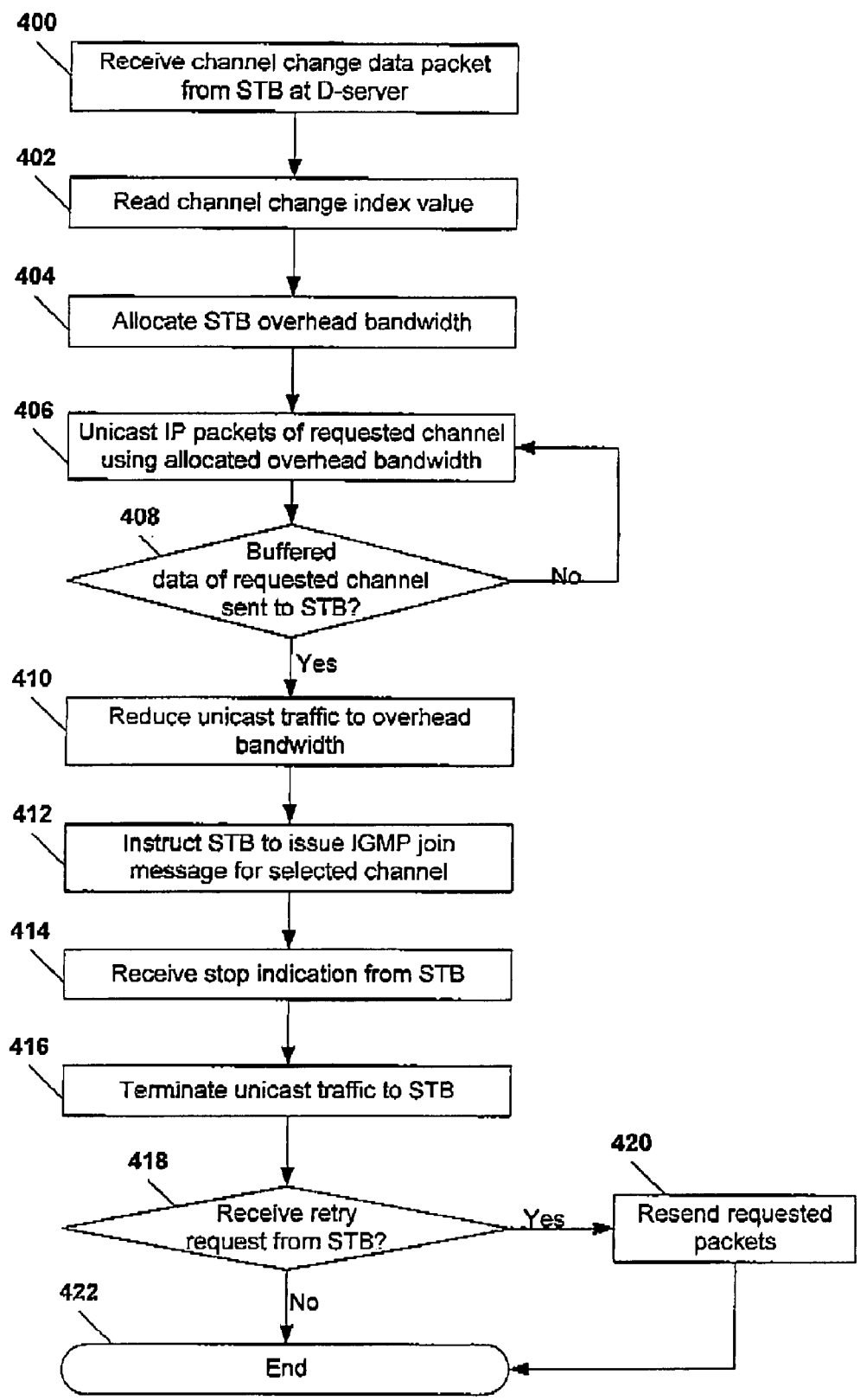
FIG. 4 is a flow diagram of a particular embodiment of a method of providing video content.

Referring to FIG. 4, a flow diagram of a particular embodiment of a method of indicating video quality is illustrated. At block 400, a D-server receives a channel change data packet from a set-top box device via an Internet Protocol Television (IPTV) network. In an illustrative embodiment, the channel change data packet can indicate a requested channel and a channel change index value. Moving to block 402, the D-server reads a channel change index value from the channel change data packet. The channel change index value indicates an available bandwidth at the subscriber premise to receive video content of the requested channel. The channel change index value can indicate, for example, how many set-top box devices, display devices, or a combination thereof, are receiving video content at the premise associated with the requesting set-top box device via the IPTV network.

Proceeding to block 404, the D-server allocates an overhead bandwidth to the requesting set-top box device based on the channel change index value. For example, the D-server can retrieve data corresponding to a channel change index table stored at the D-server and allocate an overhead bandwidth equal to the subscribed bandwidth associated with the requesting set-top box device divided by the channel change index value. Continuing to block 406, the D-server expedites transmission of video content associated with the requested channel, by unicasting IP data packets including the video content to the set-top box device at a rate equal to the subscribed bandwidth associated with the set-top box device plus the overhead bandwidth allocated to the set-top box device by the D-server.

Advancing to decision node 408, the D-server determines whether it has sent an amount of data buffered at the D-Server for the requested channel to the set-top box device. If the D-server has not sent all the buffered data, the method can return to block 406, and the D-server continues unicasting the IP data packets to the set-top box device. Conversely, if the D-server has sent all the buffered data, the method proceeds to block 410, and the D-server reduces the rate at which it unicasts IP data packets to the set-top box device to the overhead bandwidth.

At block 412, the D-server sends an instruction to the set-top box device to send a join request to a multicast video server to join a multicast group associated with the requested channel. Moving to block 414, D-server can receive a stop indication from the set-top box device. The stop indication can indicate that the set-top box device has been joined to the multicast group associated with the requested channel. Proceeding to block 416, the D-server stops unicasting video content to the set-top box device in response to the stop indication.

At decision node 418, in an illustrative, non-limiting embodiment, the D-server can determine whether it has received a retry request from the set-top box device. A retry request can indicate a gap between video content received from the D-server and video content received from the multicast video server. If the D-server determines that it has received a retry request, the method moves to block 420, and D-server can resend one or more data packets identified by the retry request to the set-top box device. The resent data packets can be transmitted at the subscribed rate associated with the set-top box device or at an increased rate, such as a predefined packet retry rate, or a rate equal to the subscribed rate, plus the overhead channel change rate. The method terminates at 422.

Figure 5:
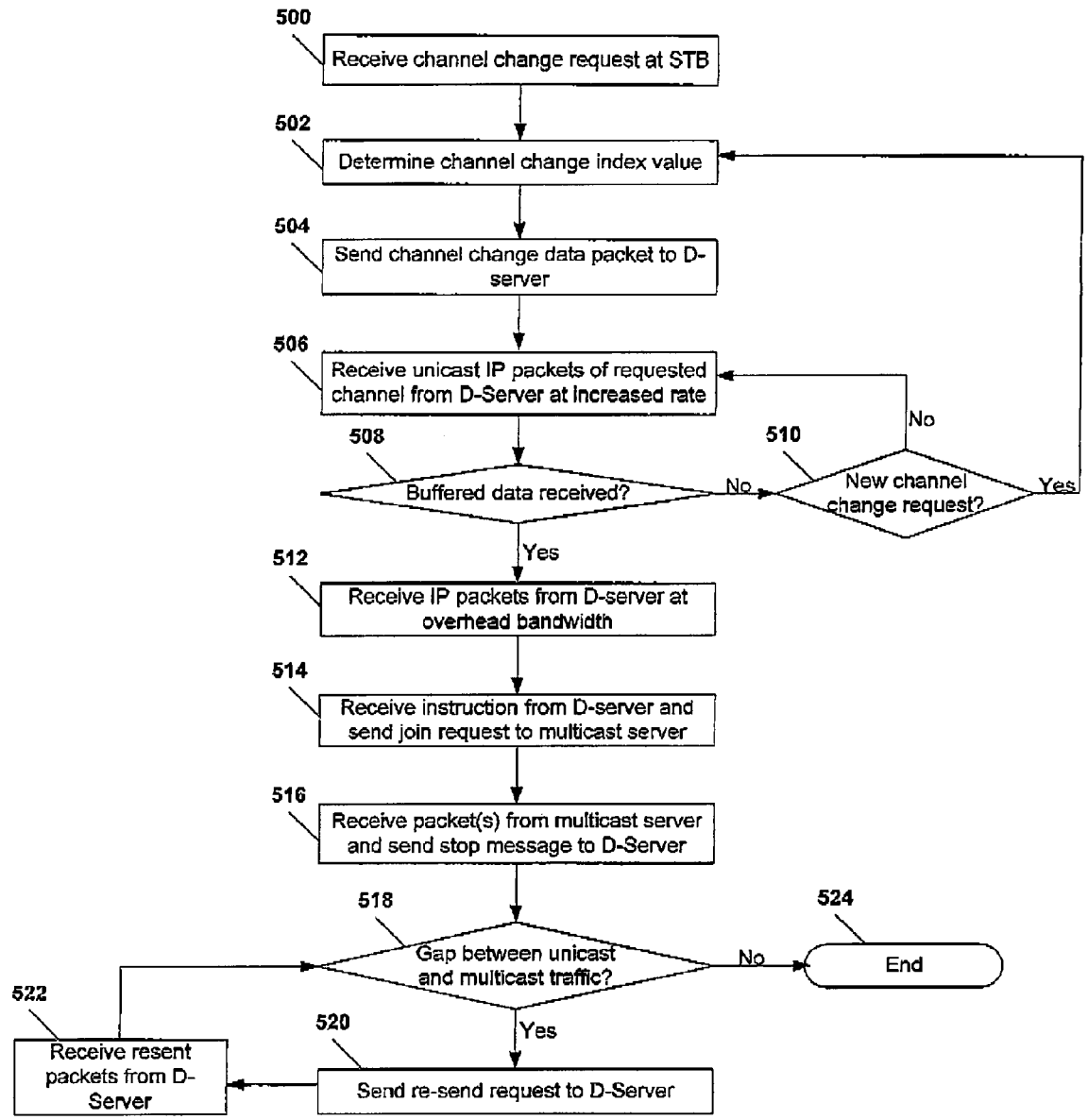
FIG. 5 is a flow diagram of a second particular embodiment of a method of providing video content.

Referring to FIG. 5, a flow diagram of a second particular embodiment of a method of indicating video quality is illustrated. At block 500, a set-top box device receives a channel change request from a viewer. Moving to block 502, the set-top box device sends a channel change determines a channel change index value, such as a number of set-top box devices receiving video content via an Internet Protocol Television (IPTV) network at the viewer's premise. Proceeding to block 504, the set-top box device sends a channel change data packet to a D-server via the IPTV network. The channel change data packet includes data indicating a request channel and the channel change index value.

Continuing to block 506, the set-top box device receives unicast IP data packets including video content associated with the requested channel from the D-server at an increased rate equal to the subscribed bandwidth associated with the set-top box device, plus an overhead channel change bandwidth allocated to the set-top box device by the D-server. At node 508, if the set-top box has not received all video data buffered at the D-server for the requested channel, the method can proceed to decision node 510, and the set-top box device can determine whether a new channel change request has been received at the set-top box device. If the set-top box determines that a new channel change request has been received, the method can return to block 502. On the other hand, if the set-top box determines that a new channel change request has not been received, the method can return to block 506.

Returning to node 508, if the set-top box has received all video data buffered at the D-Server for the requested channel, the method moves to block 512, and the set-top box device begins receiving video content of the requested channel from the D-server at the overhead bandwidth associated with the set-top box device. Proceeding to block 514, the set-top box device receives an instruction from the D-server to join a multicast group associated with the requested channel and sends a join request to a multicast video server to join the multicast group.

Continuing to block 516, the set-top box device receives one or more IP data packets including video content associated with the requested channel from the multicast video server. The set-top box device sends a stop indication to the D-server. Advancing to decision node 518, in an illustrative, non-limiting embodiment, the set-top box device can determine whether there is a gap between the video content received from the D-server and the video content received from the multicast video server. If the set-top box device that there is a gap, the method can proceed to block 520, and the set-top box device can issue a retry request to the D-server. Moving to block 522, the set-top box device receives data packets resent by the D-server to fill the gap. The resent data packets can be received at the subscribed rate or at an increased rate, such as a pre-defined packet retry rate, or a rate equal to the subscribed rate, plus the overhead channel change rate. The method terminates at 524.

In particular embodiments, the disclosed methods can be performed as described herein. Alternatively, aspects of the methods can be performed in alternative sequences or concurrently. For example, after sending buffered data of a requested channel to a set-top box device, a D-server can reduce unicast traffic to the set-top box device to the overhead bandwidth and send an instruction to the set-top box device to join a multicast group in any order or simultaneously.

Figure 6:
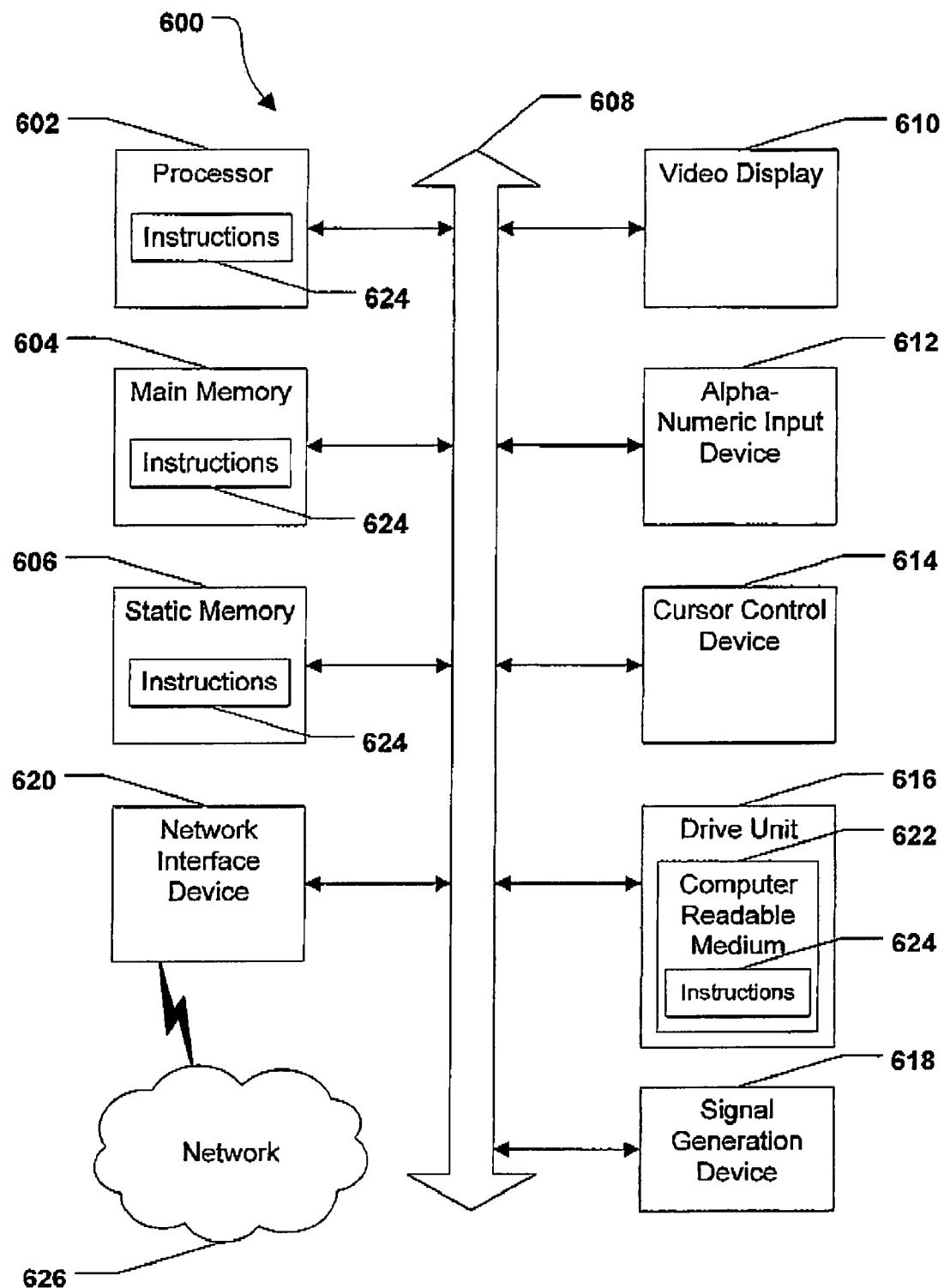
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices, such as a set-top box device, multicast video server or D-server, as illustrated in FIGS. 1-3.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, which can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing video content, the method comprising:
   receiving a channel change data packet from a set-top box device at a subscriber premises via a packet-based video distribution network, the channel change data packet including data indicating a requested channel and a channel change index value, wherein the subscriber premises includes a plurality of set-top boxes, a plurality of display devices, or a combination thereof, wherein the channel change index value is a number of set-top boxes of the plurality of set-top boxes, display devices of the plurality of display devices, or combination thereof, that are receiving video content at the subscriber premises;
   reading the channel change data packet to identify the channel change index value;
   determining an available bandwidth at the subscriber premises to receive video content of the requested channel via the packet-based video distribution network based on the channel change index value; and
   allocating an overhead bandwidth to the set-top box device based on the channel change index value.

2. The method of claim 1, further comprising sending video content of the requested channel to the set-top box device at a channel change rate equal to a subscribed bandwidth associated with the set-top box device, plus the allocated overhead bandwidth.

3. The method of claim 2, further comprising sending video content associated with the requested channel to the set-top box device at the overhead bandwidth after sending an amount of buffered video content associated with the requested channel to the set-top box device at the channel change rate.

4. The method of claim 3, further comprising sending an instruction to the set-top box device to join a multicast group associated with the requested channel.

5. The method of claim 4, further comprising:
   receiving a stop indication from the set-top box device, the stop indication indicating that he set-top box device has received at least one video data packet from a multicast video server associated with the requested channel;
   and ceasing transmission of video content to the set-top box device in response to the stop indication.

6. The method of claim 5, further comprising:
   receiving a retry request from the set-top box device, the retry request indicating a gap in video content received at the set-top box device; and resending at least one video data packet including video content associated with the requested channel to the set-top box device.

7. A method of providing video content, the method comprising: receiving a channel change request at a set-top box device at a subscriber premises, wherein the subscriber premises includes a plurality of set-top boxes, a plurality of display devices, or a combination thereof;
determining a channel change index value, the channel change index value is a number of set-top boxes of the plurality of set-top boxes, display devices of the plurality of display devices, or combination thereof, that are receiving video content at the subscriber premises; and
sending a channel change data packet from the set-top box device to a server via a packet-based video distribution network, the channel change data packet including data indicating a requested channel and the channel change index value;
wherein the channel change index value indicates may be used to determine an available bandwidth at the subscriber premise premises to receive video content of the requested channel via the packet-based video distribution network.

8. The method of claim 7, further comprising receiving video content from the server at a channel change rate equal to a subscribed bandwidth associated with the set-top box device, plus an overhead bandwidth related to the channel change index value.

9. The method of claim 8, further comprising receiving video content associated with the requested channel from the server at the overhead bandwidth after receiving an amount of buffered video content of the requested channel from the server.

10. The method of claim 9, further comprising:
receiving an instruction from the server to join a multicast group associated with the requested channel; and
sending a multicast group join request to a multicast video server associated with the requested channel.

11. The method of claim 10, further comprising sending a stop indication to the server, the stop indication indicating that the set-top box device has received at least one video data packet from the multicast video server.

12. The method of claim 10, further comprising:
identifying a gap between video content received from the server and video content received from the multicast video server;
sending a retry request to the server, the retry request indicating the gap and one or more requested video data packets to be re-sent to the set-top box device; and
receiving the one or more requested video data packets at the set-top box device.

13. A system to provide video content, the system comprising:
a server system including processing logic and memory accessible to the processing logic, wherein the memory includes instructions executable by the processor to:
receive a channel change data packet from a set-top box device at a subscriber premises via a packet-based video distribution network, the channel change data packet including data indicating a requested channel and a channel change index value, wherein the subscriber premises includes a plurality of set-top boxes, a plurality of display devices, or a combination thereof, wherein the channel change index value is a number of set-top boxes of the plurality of set-top boxes, display devices of the plurality of display devices, or combination thereof, that are receiving video content at the subscriber premises;
identify the channel change index value;
determine an available bandwidth at the subscriber premises receiving video content via the packet-based video distribution network based on the channel change index value; and
allocate an overhead bandwidth to the set-top box device based on the channel change index value.

14. The system of claim 13, wherein the memory stores an index value table relating a plurality of channel change index values to a plurality of overhead channel change bandwidth values, a plurality of factors or multiples determining overhead channel change bandwidth values based on a subscribed bandwidth, or any combination thereof.

15. The system of claim 13, wherein the memory stores video content associated with the requested channel.

16. The system of claim 15, wherein the memory stores instructions to send video content associated with the requested channel to the set-top box device at an increased rate that includes the allocated overhead bandwidth.

17. The system of claim 16, wherein the memory stores instructions executable by the processing logic to send the video content to the set-top box device via unicast Internet Protocol (IP) video data packets.

18. The system of claim 16, wherein the memory includes:
a video content buffer that buffers video data associated with a plurality of channels, including the requested channel; and
instructions executable by the processing logic to send video content associated with the requested channel to the set-top box device at the overhead bandwidth after sending an amount of buffered video data associated with the requested channel to the set-top box device.

19. The system of claim 18, wherein the memory includes instructions executable by the processing logic to cease transmission of video content to the set-top box device in response to a stop indication from the set-top box device, the stop indication indicating that the set-top box device has received at least one video data packet from a multicast video server associated with the requested channel.

20. The system of claim 13, wherein the server system includes a network interface to communicate with the set-top box device via an Internet Protocol Television (IPTV) access network.

21. The system of claim 20, wherein the server system is a dedicated channel change server system communicating with the IPTV access network via a regional router.

22. A set-top box device, comprising:
a network interface communicating with a packet-based video distribution network, wherein a subscriber premises includes a plurality of set-top boxes, a plurality of display devices, or a combination thereof;
a processor; and
a memory device accessible to the processor, wherein the memory device includes instructions executable by the processor to:
receive a channel change request;
determine a channel change index value, the channel change index value is a number of set-top boxes of the plurality of set-top boxes, display devices of the plurality of display devices, or combination thereof, at the subscriber premises that are receiving video content at the subscriber premises; and
send a channel change data packet to a server via a packet-based video distribution network, the channel change data packet including data indicating a requested channel and the channel change index value;

wherein the channel change index value may be used to determine an available bandwidth at the subscriber premises to receive video content via the packet-based video distribution network.

23. The set-top box device of claim 22, further comprising a video content buffer to receive video content from the server at a rate equal to a subscribed bandwidth associated with the set-top box device, plus an overhead bandwidth related to the channel change index value.

24. The set-top box device of claim 23, wherein the memory includes instructions executable by the processor to send data to the server indicating that the buffer is full.

25. The set-top box device of claim 24, wherein the memory includes instructions executable by the processor to send a multicast group join request to a multicast video server associated with the requested channel after the buffer is full.

26. The set-top box device of claim 25, wherein the memory includes instructions to send a stop indication to the server, the stop indication indicating that the set-top box device has received at least one video data packet from the multicast video server.

27. A non-transitory computer-readable medium including processor-readable instructions adapted to cause a processor to execute a method comprising:
receiving a channel change data packet from a set-top box device at a subscriber premises via a packet-based video distribution network, the channel change data packet including data indicating a requested channel and a channel change index value, wherein the subscriber premises includes a plurality of set-top boxes, a plurality of display devices, or a combination thereof, wherein the channel change index value is a number of set-top boxes of the plurality of set-top boxes, display devices of the plurality of display devices, or combination thereof, that are receiving video content at the subscriber premises;
reading the channel change data packet to identify the channel change index value;
determining an available bandwidth at the subscriber premises to receive video content of the requested channel via the packet-based video distribution network based on the channel change index value;
allocating an overhead bandwidth to the set-top box device based on the channel change index value; and
sending video data packets including video content associated with the requested channel to the set-top box device at an increased rate equal to a subscribed bandwidth associated with the set-top box device, plus the allocated overhead bandwidth.

28. The non-transitory computer-readable medium of claim 27, wherein the method further comprises ceasing transmission of video content to the set-top box device after the set-top box device receives at least one multicast video data packets from a multicast server associated with the requested channel.

29. The non-transitory computer-readable medium of claim 27, wherein the method further comprises resending at least one of the video data packets in response to a retry message received from the set-top box device.

30. The non-transitory computer-readable medium of claim 29, wherein the at least one of the video data packets are sent using the subscribed rate, at the increased rate, or at a pre-defined re-send rate.

* * * * *